United States Patent
Liu et al.

(10) Patent No.: US 12,554,483 B2
(45) Date of Patent: Feb. 17, 2026

(54) VEHICULAR MULTI-LOCATION SYNERGIC REMOTE CALIBRATION SYSTEM AND A CALIBRATION METHOD THEREOF

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 347 days.

(21) Appl. No.: 18/243,750

(22) Filed: Sep. 8, 2023

(65) Prior Publication Data
US 2025/0085963 A1    Mar. 13, 2025

(51) Int. Cl.
*G06F 8/658* (2018.01)
*G01C 25/00* (2006.01)

(52) U.S. Cl.
CPC ............. *G06F 8/658* (2018.02); *G01C 25/00* (2013.01)

(58) Field of Classification Search
USPC .................................. 717/168–173; 701/33.1
See application file for complete search history.

(56) References Cited

U.S. PATENT DOCUMENTS

| | | | |
|---|---|---|---|
| 2005/0090906 A1* | 4/2005 | Shi | G11C 16/102 710/100 |
| 2010/0256836 A1 | 10/2010 | Mudalige | |
| 2013/0246135 A1 | 9/2013 | Wang | |
| 2015/0277891 A1 | 10/2015 | Choi | |
| 2018/0095742 A1 | 4/2018 | Richter et al. | |
| 2018/0252550 A1* | 9/2018 | Kabakian | G01P 21/00 |
| 2019/0302761 A1 | 10/2019 | Huang et al. | |
| 2019/0316539 A1 | 10/2019 | Prabhu et al. | |
| 2021/0341917 A1 | 11/2021 | Feng et al. | |
| 2022/0222989 A1* | 7/2022 | Xiao | G07C 9/00309 |

FOREIGN PATENT DOCUMENTS

| | | |
|---|---|---|
| CN | 103455023 A | 12/2013 |
| CN | 106850798 A | 6/2017 |
| CN | 108667894 A | 10/2018 |
| CN | 110808892 A | 2/2020 |

(Continued)

OTHER PUBLICATIONS

Tosun-Shanghai, TSMaster Application Notes, 2021.
How to use the TOSUN calibration module, TOSUN TSMaster, 2022.

*Primary Examiner* — Qing Chen
(74) *Attorney, Agent, or Firm* — Bayramoglu Law Offices LLC

(57) ABSTRACT

A vehicular multi-location synergic remote calibration method and system is provided. The vehicular multi-location synergic remote calibration system includes: a server, configured to store a calibration database and receive and store a calibration signal from a responder; a requester, configured to invoke the calibration signal from the server to read a calibration signal value; and/or, send a calibration signal write command to the server and send to the server a command for reading the written calibration signal; a responder, configured to send the calibration signal to the server, and further configured to receive a written target value from the server and complete vehicular online calibration.

15 Claims, 4 Drawing Sheets

---

S101 — the server stores a calibration database and receives and stores a calibration signal from the responder.

S102 — the requester invokes the calibration signal from the server to read a calibration signal value; and/or, the requester sends a calibration signal write command to the server to send a written target value to the responder through the server, and the responder completes vehicular online calibration and the requester reads a written calibration signal by applying to the server.

(56) References Cited

FOREIGN PATENT DOCUMENTS

| | | |
|---|---|---|
| CN | 111679659 A | 9/2020 |
| CN | 113050598 A | 6/2021 |
| CN | 113358588 A | 9/2021 |
| CN | 114852096 A | 8/2022 |
| CN | 115032962 A | 9/2022 |
| CN | 116700078 A | 9/2023 |
| JP | 2023057532 A | 4/2023 |
| KR | 20120129053 A | 11/2012 |
| KR | 20180135590 A | 12/2018 |
| RU | 2019102653 A | 8/2020 |

\* cited by examiner

VEHICULAR MULTI-LOCATION SYNERGIC REMOTE CALIBRATION SYSTEM AND A CALIBRATION METHOD THEREOF

TECHNIC FIELD

The present disclosure relates to the field of vehicular software development technologies and in particular to a vehicular multi-location synergic remote calibration method and system.

BACKGROUND

In the related arts, the inventor knows that automatic function of a calibration system is only limited to one computer, and a user needs to write his own program for automated calibrating a local electronic control unit (ECU). But, in a scenario of calibration of multiple vehicles, it is required to access an ECU connected to a remote system to deploy local calibration data remotely, or when remote observation calibration data is obtained, a current own program cannot achieve the purpose but another program is to be written to access a remote ECU. Further, the two programs cannot achieve data fusion.

SUMMARY

The present disclosure relates to a vehicular multi-location synergic remote calibration method and system. The vehicular multi-location synergic remote calibration system includes:
  a server, configured to store a calibration database and receive and store a calibration signal from a responder;
  a requester, configured to invoke the calibration signal from the server to read a calibration signal value; and/or, send a calibration signal write command to the server and send to the server a command for reading the written calibration signal;
  a responder, configured to send the calibration signal to the server, and further configured to receive a written target value from the server and complete vehicular online calibration.

The summary of the present disclosure aims to provide brief descriptions for the subjects of the specification. Thus, it should be understood that the above features are only illustrative and shall not be interpreted as narrowing the scope or essence of the subject of the specification in any way.

Other features, aspects and advantages of the subjects of the present disclosure will become apparent by way of the specific embodiments, drawings and claims.

BRIEF DESCRIPTION OF THE DRAWINGS

In order to more clearly describe the technical solutions in the specific embodiments of the present disclosure or in the prior arts, the drawings required for descriptions of the specific embodiments or the prior arts will be briefly introduced below. Apparently, the drawings hereunder are some embodiments of the present disclosure, and other drawings may be obtained by those skilled in the arts based on these drawings without making creative work.

DETAILED DESCRIPTION OF THE EMBODIMENTS

In order to make the objects, the technical solutions and the advantages of the embodiments of the present disclosure clearer, the technical solutions of the present disclosure will be clearly and fully described below in combination with drawings. Apparently, the embodiments described herein are some embodiments of the present disclosure rather than all embodiments. All other embodiments obtained by those skilled in the arts based on these embodiments of the present disclosure without making creative work shall fall within the scope of protection of the present disclosure.

The invention has already known that, in a scenario of calibration of multiple vehicles, the vehicles are usually distributed in different cities. Under relevant technical conditions, it is impossible to drag the calibration signals of same name in the vehicles in different locations into a same curve window for observation nor repeat the operation of an algorithm program in the vehicles in other cities by directly running the algorithm program on a computer of a local developer but copy the algorithm program to the developer computers in other cities at the same time for the purpose of execution by the developers in other cities. In other words, the software products of same type can only achieve local monitoring for the ECU and cannot achieve simultaneous monitoring and interoperation on the ECU of the local computer and the ECUs connected with the remote computers.

One or more embodiments provide a vehicular multi-location synergic remote calibration method. Various non-limiting implementations of the embodiments of the present disclosure will be described in details below in combination with accompanying drawings.

Figure 1:
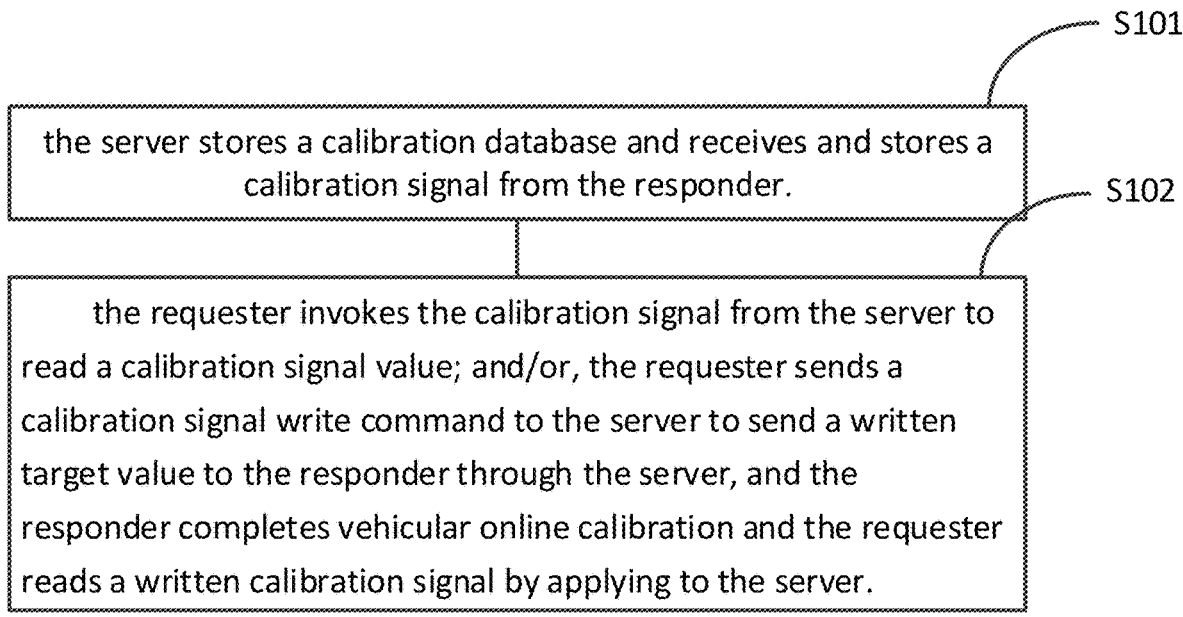
FIG. 1 is a schematic diagram illustrating steps of a vehicular multi-location synergic remote calibration method according to some embodiments of the present disclosure.

As shown in FIG. 1, at least one embodiment provides a vehicular multi-location synergic remote calibration method, which includes:
  a server, a requester and a responder; wherein,
    at step S101, the server stores a calibration database and receives and stores a calibration signal from the responder; and,
    at step S102, the requester invokes the calibration signal from the server to read a calibration signal value; and/or, after the calibration signal is written, the requester sends a written target value to the responder through the server, and the responder completes vehicular online calibration and the requester reads a written calibration signal by applying to the server.

In some application embodiments, the responder refers to computers connected to a vehicular ECU in different cities, and the requester refers to a computer locally connected with a vehicular ECU. Each responder is applicable to sending a calibration signal to the server. The requester creates a corresponding mapping system variable for each calibration signal of the server; and an initial value is assigned to the mapping system variables. Subsequently, by simply reading or modify-writing a corresponding calibration signal on the requester, the developers can achieve monitoring or synchronous modification for the vehicular calibration signal values in different cities based on the vehicular calibration signals distributed in different cities, thus effectively improving the convenience and accuracy of the multi-vehicle calibration.

The calibration database is configured to at least store all calibration signals of the corresponding ECU of each responder, including a calibration signal of observation variable, a calibration signal of writable observation variable and a calibration signal of calibration variable.

Figure 2:
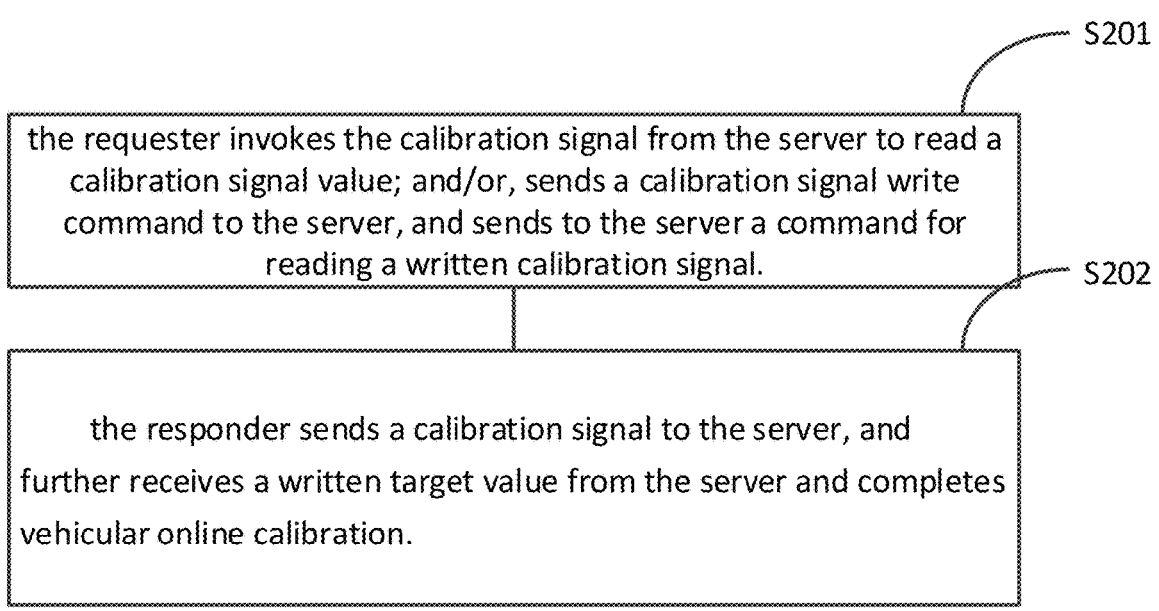
FIG. 2 is a schematic diagram illustrating steps of a vehicular multi-location synergic remote calibration method according to some embodiments of the present disclosure.

As shown in FIG. 2, in some embodiments, the vehicular multi-location synergic remote calibration method includes the following steps.

At step S201, the requester invokes the calibration signal from the server to read a calibration signal value; and/or, sends a calibration signal write command to the server, and sends to the server a command for reading a written calibration signal.

At step S202, the responder sends a calibration signal to the server, and further receives a written target value from the server and completes vehicular online calibration.

The vehicular multi-location synergic remote calibration method will be detailed below in combination with some application examples.

For example, in a scenario of calibration of three vehicles, the vehicles are distributed in three different cities. A computer used for calibration in a city A is defined as a requester, and computers connected to vehicular ECU1 and ECU2 in other two cities are defined as responders.

The developer in the city A firstly performs local calibration. The developer creates mapping system variables of same name "ECU_Factor1" and "ECU_Factor2" associated with calibration signals Factor1 and Factor2 in a local vehicular ECU, and then by writing a graphic program, modifies "Factor1" and "Factor2" in sequence until an execution result of an algorithm is as desired. For example, "Factor1=1.2" and "Factor2=2.3", where Factor1 represents a calibration signal of a wheel speed sensor and Factor2 represents a calibration signal of an acceleration sensor. Each ECU includes the two calibration signals Factor and Factor2.

The developer in the city A desires to run the same graphic program in the vehicular ECUs in other cities to repeat the execution of the algorithm. If this embodiment is not employed, it is impossible to repeat the execution process of the algorithm in the vehicles in other cities by directly running the graphic program in the computer of the developer in the city A. Usually, it is required to copy the graphic program to the computers of the developers in other cities at the same time for execution by the developers in other cities. In the vehicular multi-location synergic remote calibration method, the above problem can be directly solved by creating a corresponding mapping system variable for each calibration signal through the requester.

The specific steps are as follows:

(1) The computer used for calibration in the city A is used as a requester, and hence, the developer in the city A allows a calibration module in the local computer to be connected to the responders in other cities through the server at the same time so as to connect with the vehicular ECU1 and ECU2 in other cities, and thus one requester is connected to a plurality of responders at the same time. The responders in other cities can send the calibration signals of the ECU1 and ECU2 to the server.

(2) After the local computer in the city A is successfully connected to the vehicular ECU1 and ECU2 in other cities, the calibration module in the local computer locally and automatically creates mapping system variables "ECU1_Factor1", "ECU1_Factor2" and "ECU2_Factor1", "ECU2_Factor2" for the corresponding calibration signals of the ECU1 and ECU2 stored in the server.

(3) The developer in the city A uses wildcard to update codes in the graphic program of the local computer (requester), namely, ECU* Factor1=1.2", "ECU* Factor2=2.3". Subsequently, the graphic program is run, and the server sends a running result of the graphic program to the vehicular ECU1 and ECU2 in other cities through corresponding responders respectively, that is, the corresponding calibration signals Factor1 in the ECU1 and ECU2 are modified to 1.2, and the corresponding calibration signals Factor2 are modified to 2.3. In this way, the requirements of the developer in the city A can be satisfied: updating codes by using wildcard in the graphic program of the requester and sending the running result of the graphic program to at least one responder through the server.

It is to be noted that in some embodiments, the wildcard refers to a special character used to match a character string with a preset mode. When the values of the mapping system variables are batch-modified, one batch of mapping system variables can be quickly matched by using wildcard so as to perform batch modification. With ECU*_Factor as an example, the * herein is a wildcard, which can match any character or character string. Thus, ECU*_Factor can match the mapping system variable ECU1_Factor, the mapping system variable ECU2_Factor, and the mapping system variable ECU3_Factor and the like. The preset naming rule for the mapping system variables can be followed as long as their prefix is ECU and their suffix is Factor.

The method of batch-modifying data includes: replacing the wildcard with a specific character string. For example, if the values of the mapping system variables ECU1_Factor, ECU2_Factor, ECU3_Factor and the like are all modified to 1.5, it is only required to replace ECU*_Factor with 1.5. This way, the values of these mapping system variables can be batch-modified.

For example, in a scenario of calibration of four vehicles, the vehicles are distributed in four different cities. A computer used for calibration in the city A is defined as a requester, and computers connected with the vehicular ECU1, ECU2 and ECU3 in other three cities are defined as responders.

The developer in the city A firstly performs local calibration. The developer creates mapping system variables of same name ECU_Result1 associated with Result1 measurement signal in a local vehicular ECU, and drags them into a curve window for monitoring. Relevant parameter values are adjusted by using the calibration module and the monitored Result1 signal is evaluated to confirm the validity of the adjusted parameters.

After completing local calibration, the developer in the city A publishes a current version of the ECU algorithm and updates the ECU algorithms of other cities to the current version through the server.

Subsequently, the developer in the city A also desires to evaluate the running circumstance of the algorithm in different environments of other cities by monitoring the Result1 signal in the ECU of each vehicle in other cities. If this embodiment is not employed, it is impossible to drag the signals of same name Result1 in the vehicles in multiple locations into a same curve window for observation.

In the vehicular multi-location synergic remote calibration method provided by some embodiments, by creating the corresponding mapping system variable for each calibration signal of the server through the requester, the signals of same name Result1 of different ECUs can be dragged into a same curve window for observation. The specific method is described below.

(1) The computer used for calibration in the city A is used as a requester. The developer in the city A allows the calibration module in the local computer (i.e. the requester) to be successfully connected to the responders in other cities at the same time so as to connect with the vehicular ECU1, ECU2, ECU3 in other cities. Thus one requester is connected to a plurality of responders at the same time. The responders in other cities can send the calibration signals of the ECU1, ECU2 and ECU3 to the server.

(2) After the local computer in the city A is successfully connected to the vehicular ECU1, ECU2 and ECU3 in other cities, the calibration module in the local computer locally and automatically creates mapping system variables "ECU1_Result1", "ECU2_Result1" and "ECU3_Result1" for the corresponding calibration signals of the ECU1, ECU2 and ECU3 stored in the server, where the Result1 represents an external environmental temperature of a vehicle obtained by a vehicle sensor through monitoring. Hence, "ECU1_Result1", "ECU2 Result1" and "ECU3_Result1" represent the external environmental temperatures of respective vehicles obtained by the ECU1, ECU2 and ECU3 through monitoring.

(3) The developer in the city A can monitor the three mapping system variables "ECU1_Result1", "ECU2_Result1" and "ECU3_Result1" simultaneously by locally dragging them into a same curve window. Therefore, the running adaptability of the current algorithm in other cities can be evaluated based on the monitoring result.

In some embodiments, the naming rule for the automatically-created mapping system variables is as follows:

A calibration signal name and an ECU name are separated by an underscore, with the ECU name as a prefix. For example, if the calibration signal name is "abc" and the ECU name is "ABS", the name of the mapping system variable is "ABS_abc".

In some embodiments, the requester invokes the calibration signal from the server to read the calibration signal value, which includes:
for a calibration signal defined as an observation variable, obtaining, by the calibration module, the calibration signal value stored in the server and storing the calibration signal value into a corresponding mapping system variable;
when reading the mapping system variable, reading a last-stored value of the mapping system variable.

After each mapping system variable is created, the calibration module in the requester is firstly connected to the local ECU through the server to read a current value of each calibration signal from the local ECU (a value at the time of successfully connecting with the ECU), and assign each current value to the corresponding mapping system variable, thus assigning an initial value to each mapping system variable.

Since the calibration module reads, in real time, the calibration signal value stored in the server and stores the value into the corresponding mapping system variable, it is guaranteed that the value of the mapping system variables is always the latest one. If a user desires to read the latest value of a calibration signal, it is only required to read the latest value of the mapping system variable, i.e. the last-stored value of the mapping system variable. The last storage time point refers to a timestamp of a moment when the calibration module reads the calibration signal value last.

The method of reading the calibration signal defined as an observation variable is described in details with the following examples.

When a functional test is performed on a vehicular ECU connected to a responder, it is determined by using the graphic program of the requester whether the supply voltage signal KL30 of the vehicular ECU is greater than 9V.

Firstly, the responder sends in advance the supply voltage signal KL30 of the ECU to the server for storage, and then the calibration module of the requester invokes the calibration database of the server and automatically creates a mapping system variable "ECU_KL30" for the supply voltage signal in the calibration database.

The user writes a graphic program for determining the supply voltage signal on the requester, where an expression of an execution unit corresponding to the determination is "ECU_KL30>9".

Then, the user starts test, and the calibration module of the requester is connected to the ECU of the responder through the server to read the current value of the KL30 signal in the ECU and assign the value to the mapping system variable "ECU_KL30". Thus, an initial value is assigned to the mapping system variable "ECU_KL30".

Next, the calibration module periodically reads the value of the KL30 signal by polling or DAQ, and stores the value into the mapping system variable "ECU_KL30".

Finally, when the execution unit for executing the graphic program of the user is "ECU_KL30>9", the value of the mapping system variable "ECU_KL30" is directly read and then compared with 9.

As one of the embodiments, the method of writing the calibration signal includes:
for a calibration signal defined as a calibration variable, associating, by the requester, an assignment function to an asynchronous function, where the assignment function is a mapping system variable write function of a to-be-written target value;
when the calibration variable is written, sending, by the asynchronous function, to the server a write command and a read command and then returning immediately, wherein the call of the asynchronous function is completed.

The method of writing the calibration signal defined as a calibration variable is described in details with the following examples.

When a functional test is performed on a vehicular ECU connected to a responder, it is required to write the value of the calibration signal EV_Current of the vehicular ECU as 2.1 by using the graphic program of the requester so as to control the current of the corresponding electromagnetic valve EV as 2.1 amperes.

Firstly, the responder sends in advance the current signal EV_Current of the electromagnetic valve of the ECU to the server for storage, and then the calibration module of the requester invokes the calibration database of the server and automatically creates a mapping system variable "ECU_EV_Current" for the current signal of the electromagnetic valve in the calibration database.

The user writes a graphic program for writing the value of the calibration signal EV_Current as 2.1 on the requester, where an expression of an execution unit corresponding to the write operation is "ECU_EV_Current=2.1".

Then, the user starts test, and the calibration module of the requester is connected to an ECU of a responder through the server and associates an assignment function of the mapping system variable "ECU_EV_Current" to an asynchronous function "set_sys_var_async". The function of the asynchronous function is to call an API function of the calibration module of the responder to perform write and read operations on the current signal of the electromagnetic valve.

When the execution unit for executing the graphic program of the requester is "ECU_EV_Current=2.1", the calibration module of the requester may call the asynchronous function "set_sys_var_async" to introduce the target value "2.1" as a parameter. In the asynchronous function, the following requests are initiated to the server sequentially and asynchronously:
(1) a request of writing the calibration signal "ECU_EV_Current", where the request carries a parameter with a write value 2.1; and
(2) a request of reading the calibration signal "ECU_EV_Current".

After the execution unit initiates a request, there is no need to wait for a request result but immediately return from the asynchronous function "set_sys_var_async". The calibration module of the requester will write the calibration signals "ECU_EV_Current" in sequence at backstage, and send the written target value to the responder through the server, and thus the responder writes the target value. As a result, the value of the EV_Current in the ECU is changed to 2.1, and the calibration module of the requester reads the calibration signal "ECU_EV_Current" by applying to the server.

As another embodiment, the method of writing the calibration signal includes:
for a calibration signal defined as a writable observation variable, associating, by the requester, an assignment function to an asynchronous function, where the assignment function is a mapping system variable write function of a to-be-written target value;
when the writable observation variable is written, sending, by the asynchronous function, a write command and a read command to the server, and then returning immediately, wherein the call of the asynchronous function is completed.

The method of writing the calibration signal defined as a writable observation variable is described in details with the following examples.

When a functional test is performed on a vehicular ECU connected to a responder, it is required to write the value of the calibration signal EV_MAX_Current of the vehicular ECU as 1.0 by using the graphic program of the requester so as to set a maximum sampling current of the corresponding electromagnetic valve EV as 1.0 ampere.

Firstly, the responder sends in advance the maximum sampling current signal EV_MAX_Current of the electromagnetic valve of the ECU to the server for storage, and then the calibration module of the requester invokes the calibration database of the server and automatically creates a mapping system variable "ECU_EV_MAX_Current" for the maximum sampling current signal of the electromagnetic valve in the calibration database.

The user writes a graphic program for writing the value of the maximum sampling current of the electromagnetic value as 1.0 on the requester, where an expression of an execution unit corresponding to the write operation is "ECU_EV_MAX_Current=1.0".

Then, the user starts test and the calibration module of the requester is connected to an ECU of a responder through the server to read a current value of the signal EV_MAX_Current in the ECU and assign the current value to the mapping system variable "ECU_EV_MAX_Current".

Next, the calibration module of the requester periodically reads the signal value EV_MAX_Current by polling or DAQ and stores the value into mapping system variable "ECU_EV_MAX_Current".

For example, in a test process, the ECU detects the maximum sampling current of the electromagnetic valve EV is 3.0 amperes, and hence, the value of the mapping system variable "ECU_EV_MAX_Current" is rewritten as 3.0.

The calibration module of the requester also associates an assignment function of the mapping system variable "ECU_EV_MAX_Current" to an asynchronous function "set_sys_var_async", where the function of the asynchronous function is to call an API function of the calibration module to perform write and read operations on the maximum sampling current signal of the electromagnetic valve EV.

When the execution unit for executing the graphic program of the requester is "ECU_EV_MAX_Current=1.0", the calibration module of the requester may call the asynchronous function "set_sys_var_async" and introduce the target value "1.0" as a parameter. In this asynchronous function, the following requests are initiated to the server sequentially and asynchronously:
(1) a request of writing the calibration signal "ECU_EV_MAX_Current", where the request carries a parameter with a write value 1.0;
(2) a request of reading the calibration signal "ECU_EV_MAX_Current".

After the execution unit initiates a request, there is no need to wait for a request result but immediately return from the asynchronous function "set_sys_var_async". The calibration module of the requester will write the calibration signals "ECU_EV_MAX_Current" in sequence at backstage, and send the written target value to the responder through the server, and thus the responder writes the target value. As a result, the value of the EV_MAX_Current in the ECU is changed to 1.0, and the calibration module of the requester reads the calibration signal "ECU_EV_MAX_Current" by applying to the server.

In a subsequent test process, the value of the signal EV_MAX_Current in the ECU is reset to 1.0. Only when the ECU detects that the maximum current of the EV valve exceeds the value can the values of the signal EV_MAX_Current and the mapping system variable "ECU_EV_MAX_Current" be rewritten.

It is to be further noted that, the calibration signal EV_MAX_Current refers to a maximum sampling current value of the electromagnetic valve EV sampled and calculated in the ECU. For example, an initial value of "EV_MAX_Current" is 1.0. If the current sampling current is always 0.5 amperes, the value of "EV_MAX_Current" remains 1.0. Once the current sampling current is greater than 1.0 ampere, for example, the current sampling current value is 1.2, the value of the "EV_MAX_Current" will be immediately changed to 1.2. At this time, even if the current current value drops to 0.2 amperes, the "EV_MAX_Current" representing a historical maximum sampling current value still remains 1.2 without any drop. Thus, the calibration signal becomes a bidirectional read and write signal, and thus the ECU can increase it based on the actual current value obtained by sampling, and the user may also reset the calibration signal to a lower value from a use end with the advantage being that the user can read the maximum value of the calibration signal in different periods of time without encountering the case that the calibration signal increases to 3.0 from the very beginning, which results in that the subsequent observation for the calibration signal enters a blind area due to no resetting measures and hence 3.0 has to be read forever. Therefore, in this case, the value of the signal EV_MAX_Current in the ECU is reset to 1.0 and the values of the calibration signal EV_MAX_Current and the mapping system variable "EV_MAX_Current" can be rewritten only when the ECU detects the maximum current of the EV valve exceeds this value.

In some embodiments, when the server executes the write command and the read command successfully at the same time, the requester refreshes the last-stored value of the mapping system variable into a to-be-written target value.

In some embodiments, the calibration signal of observation variable refers to a calibration signal purely for observation, for example, an engine rotation signal and a vehicle speed signal and the like. These signals are determined based on measurement for relevant information of the physical world and can reflect objective facts needing no modification.

In some embodiments, the calibration signal of calibration variable refers to a parameter to be set, for example, P, I and D parameters in a PID algorithm, which can determine a running status of the algorithm after modification.

In some embodiments, the calibration signal of writable observation variable refers to a signal used for observation or interfering with an observation value. For example, these signals such as the maximum current value of the electromagnetic valve may continuously increase to a maximum value along with observation. For example, if a maximum value within two hours from a current moment is to be observed, the observation value is reset and read within two hours.

In some embodiments, in response to that the requester fails to receive a calibration signal of the server, if the requester still writes the mapping system variable corresponding to the calibration signal, the requester reports an error.

The operation of writing the mapping system variable is generated by a user of the requester. The calibration module of the requester is successfully connected to an ECU of a responder through the server and then any mapping system variable can be written into the program of the user of the requester. If there is any one mapping system variable not present, an error will be generated when the mapping system variable is written. Thus, if the requester fails to receive a calibration signal of the server, it indicates that the calibration signal is not present or the transmission process of the calibration signal is failed. Thus, the mapping system variable corresponding to the calibration signal on the requester cannot be initialized, that is, the corresponding mapping system variable is also not present. At this time, if a non-existent mapping system variable is written, the requester may report an error.

The write of the calibration signal when the calibration module is not enabled will be described in details with the following examples.

For example, if a functional test is performed on a vehicular ECU defined as a responder, it is required to write the value of the calibration signal EV_Current in the ECU as 2.1 by using the graphic program of the requester, to control the current of the corresponding electromagnetic valve EV as 2.1 amperes.

Firstly, the responder sends, in advance, the current signal EV_Current of the electromagnetic valve of the ECU to the server for storage, and then the calibration module of the requester invokes the calibration database of the server and automatically creates a mapping system variable named "ECU_EV_Current" for the current signal of the electromagnetic valve in the calibration database.

The user writes a graphic program for writing the value of the calibration signal EV_Current as 2.1 on the requester, where an expression of an execution unit corresponding to the write operation is "ECU_EV_Current=2.1".

Then, the user starts test and the calibration module of the requester is connected to an ECU of a responder through the server but fails, and thus the calibration module of the requester marks the mapping system variable "ECU_EV_Current" as invalid.

When the execution unit for executing the graphic program of the requester is "ECU_EV_Current=2.1", the calibration module of the requester detects the mark of the mapping system variable is invalid, abandons execution of assignment operation, and prints out error information "invalid mapping system variable: ECU_EV_Current" in the message of the calibration module of the requester.

Figure 3:
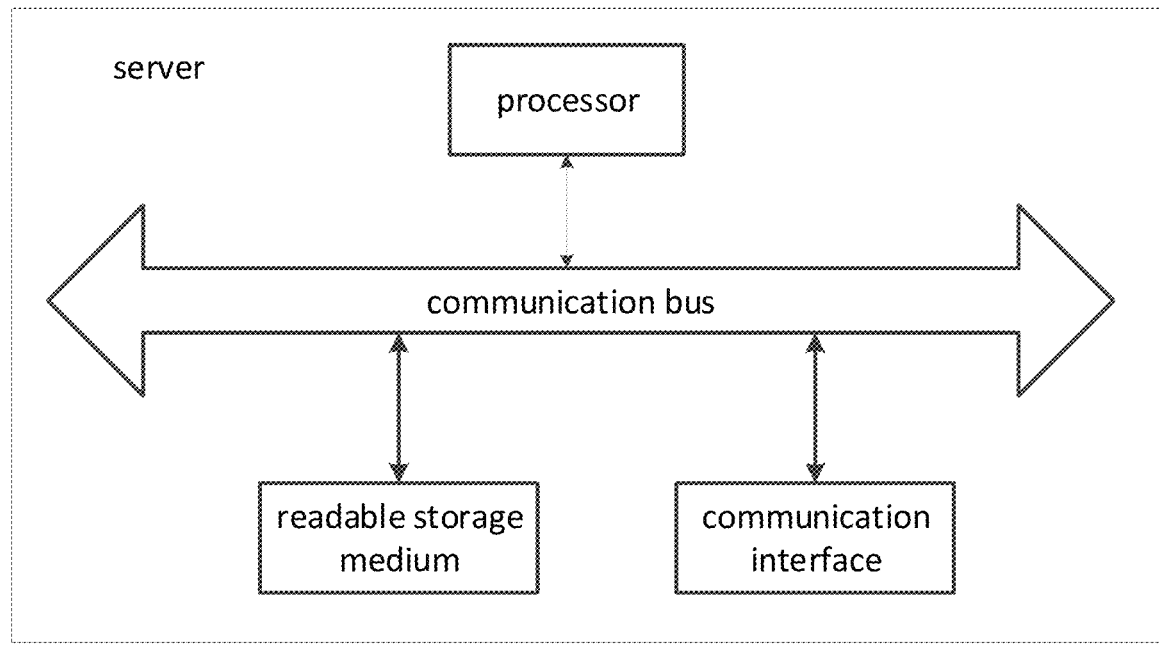
FIG. 3 is a principle block diagram illustrating a server according to some embodiments of the present disclosure.

As shown in FIG. 3, one or more embodiments further provide a server for performing the vehicular multi-location synergic remote calibration method as mentioned above, where the server is configured to store a calibration database and receive and store a calibration signal from a responder, and further send a target value written by a requester to the responder.

Specifically, the server includes a processor, a readable storage medium, a communication bus, and a communication interface. The processor, the readable storage medium and the communication interface communicate with each other via the communication bus. The readable storage medium is configured to store the calibration database and the calibration signal from the responder and execute programs of performing the vehicular multi-location synergic remote calibration method as above. The programs cause the processor to perform the operations corresponding to the vehicular multi-location synergic remote calibration method, and the processor is further configured to receive the calibration signal from the responder and send the target value written by the requester to the responder.

In some embodiments, the communication interface may be RS232, RS485, USB interface or TYPE interface or the like, which may be connected with an external bus adapter. The communication interface may also include wired or wireless network interface. The network interface may optionally include wired interface and/or wireless interface (such as WI-FI interface, Bluetooth interface and the like), which is usually used to establish communication connection between the server and other computer devices.

The readable storage medium or the computer readable storage medium includes at least one type of memories. The memory includes flash memory, harddisk drive, multimedia card, card type memory (e.g. SD or DX memory or the like), magnetic memory, magnetic disk or compact disk or the like. In some embodiments, the memory may be an internal storage unit in the computer device, for example, a harddisk drive of the computer device. In some other embodiments, the memory may also be an external storage device of the computer device, for example, a plug type hard disk drive, a smart media card (SMC), a secure digital (SD) card, a flash card or the like on the computer device. Furthermore, the memory may include both the internal storage unit in the computer device and the external storage device. The memory may be used to not only store an application software installed on the computer device and various types of data, for example, the codes of the computer programs and the like but also temporarily store data already output or to be output.

In some embodiments, the processor may be a central processing unit (CPU), a controller, a microcontroller, a microprocessor or another data processing chip, which is used to run the program codes in the memory or process the data, for example, execute the computer programs or the like.

In some embodiments, the communication bus may also be an input/output bus, which may be a Peripheral Component Interconnect (PCI) bus, or an Enhanced Industry Standard Architecture (EISA) bus or the like. The bus may include an address bus, a data bus and a control bus and the like.

One or more embodiments further provide a working method of a requester in a vehicular multi-location synergic remote calibration process, which includes: invoking, by the requester, a calibration signal from a server to read a calibration signal value; and/or, sending, by the requester, to the server a calibration signal write command and sending to the server a command for reading a written calibration signal.

The requester creates a corresponding mapping system variable for each calibration signal of the server; an initial value is assigned to the mapping system variables; the method of invoking, by the requester, the calibration signal from the server to read the calibration signal value includes: for a calibration signal defined as an observation variable, obtaining, by a calibration module in the requester, the calibration signal value stored in the server and storing the calibration signal value into a corresponding mapping system variable; when reading the mapping system variable, reading a last-stored value of the mapping system variable.

The requester creates a corresponding mapping system variable for each calibration signal of the server; an initial value is assigned to the mapping system variables; sending, by the requester, to the server the calibration signal write command and sending to the server the command for reading the written calibration signal include: for a calibration signal defined as a calibration variable, associating, by the requester, an assignment function to an asynchronous function, where the assignment function is a mapping system variable write function of a to-be-written target value; when the calibration variable is written, sending, by the asynchronous function, to the server a write command and a read command and then returning immediately, where the call of the asynchronous function is completed.

The requester creates a corresponding mapping system variable for each calibration signal of the server; an initial value is assigned to the mapping system variables; sending, by the requester, to the server the calibration signal write command and sending to the server the command for reading the written calibration signal include: for a calibration signal defined as a writable observation variable, associating, by the requester, an assignment function to an asynchronous function, wherein the assignment function is a mapping system variable write function of a to-be-written target value; when the writable observation variable is written, sending, by the asynchronous function, a write command and a read command to the server, and then returning immediately, wherein the call of the asynchronous function is completed.

When the requester is connected with the server such that when the server executes the write command and the read command successfully at the same time, the requester refreshes the last-stored value of the mapping system variable into a to-be-written target value, and sends the written target value to the server.

In some embodiments, in response to that the requester fails to receive a calibration signal of the server, if the requester still writes the mapping system variable corresponding to the calibration signal, the requester reports an error.

Specifically, the working method of the requester in the vehicular multi-location synergic remote calibration process can be referred to the above vehicular multi-location synergic remote calibration method and will not be repeated herein.

Figure 4:
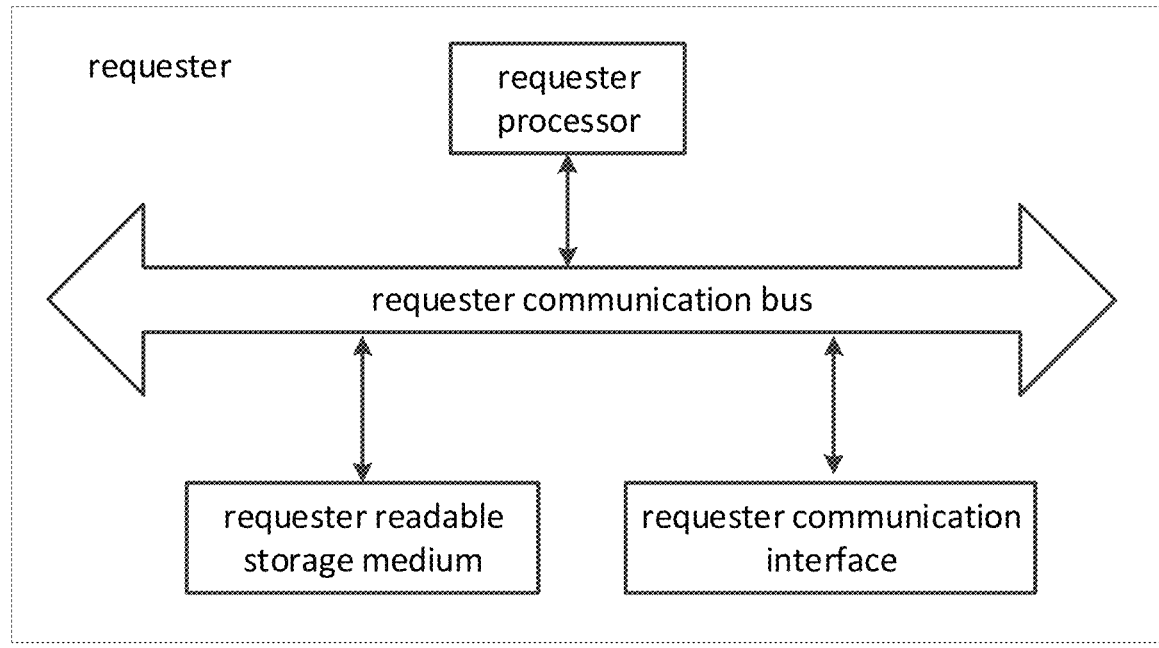
FIG. 4 is a principle block diagram illustrating a requester according to some embodiments of the present disclosure.

As shown in FIG. 4, one or more embodiments further provide a requester which is configured to execute programs of performing the working method of the requester in the vehicular multi-location synergic remote calibration process as mentioned above.

Specifically, the requester includes a requester processor, a requester readable storage medium, a requester communication bus, and a requester communication interface, where the requester processor, the requester readable storage medium, and the requester communication interface communicate with each other via the communication bus; the requester readable storage medium is configured to store programs of performing the working method of the requester in the vehicular multi-location synergic remote calibration process as mentioned above, and the programs cause the requester processor to perform the operations corresponding to the working method of the requester in the vehicular multi-location synergic remote calibration process.

Figure 5:
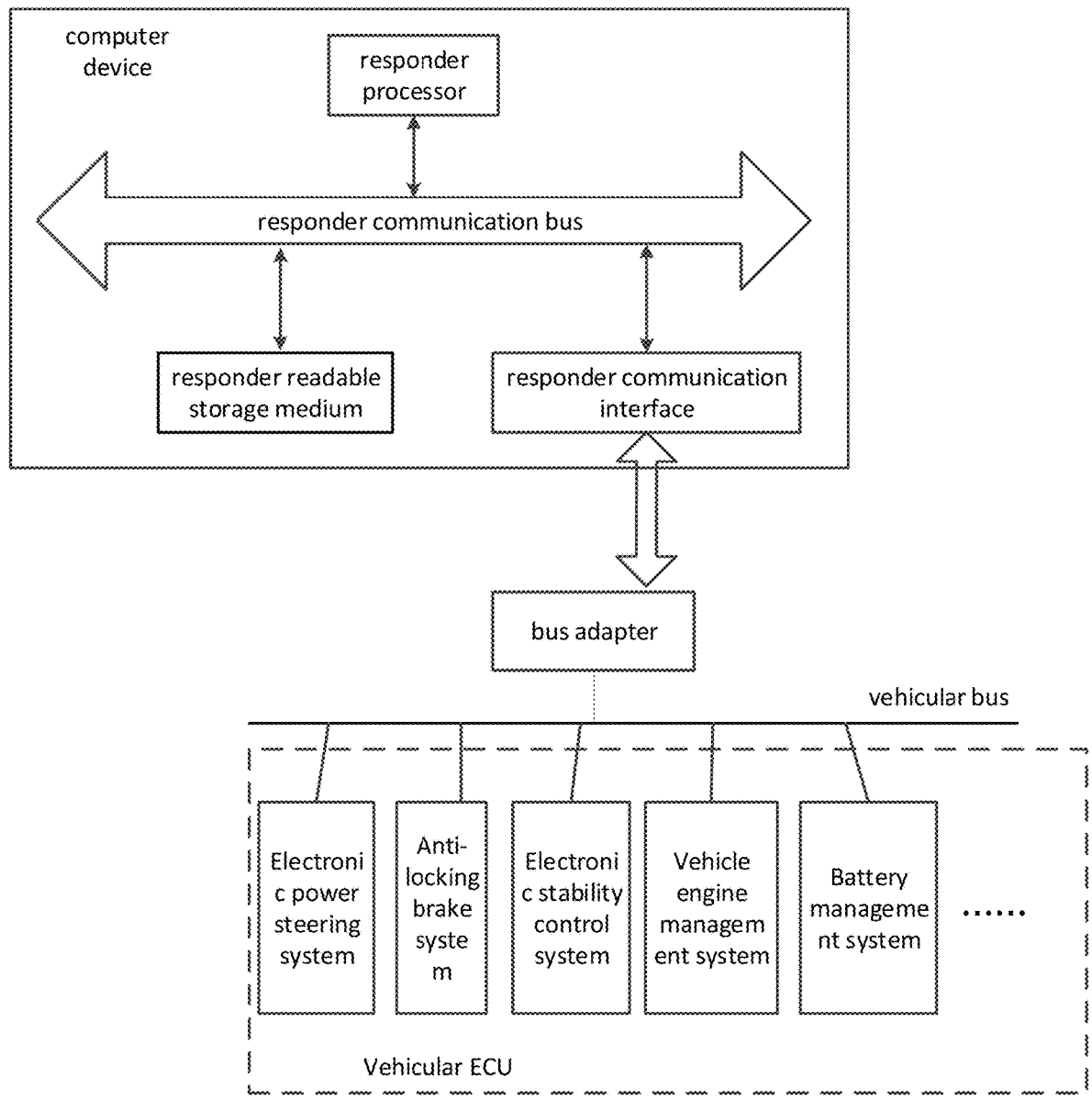
FIG. 5 is a principle block diagram illustrating a responder according to some embodiments of the present disclosure.

As shown in FIG. 5, one or more embodiments further provide a responder, which includes a computer device and a bus adapter, where the computer device is configured to send a calibration signal to a server, and receive a written target value from the server; the bus adapter is configured to read the calibration signal from an ECU and further configured to distribute the target value to the ECU to complete vehicular online calibration.

The computer device includes a responder processor, a responder readable storage medium, a responder communication bus and a responder communication interface; wherein, the responder readable storage medium is configured to store programs of performing the vehicular multi-location synergic remote calibration method as mentioned above, and the responder processor is configured to execute the programs of performing the above vehicular multi-location synergic remote calibration method;

the responder processor, the responder readable storage medium, and the responder communication interface communicate with the bus adapter via the responder communication bus.

the bus adapter is configured to read the calibration signal from the ECU and further configured to distribute to the ECU a written value generated after the processor executes the above vehicular multi-location synergic remote calibration method.

In some embodiments, the computer device corresponds to the above server and will not be repeated herein.

In some embodiments, the bus adapter may be a Controller Area Network (CAN) bus adapter, a Controller Area Network Flexible Data Rate (CANFD) bus adapter, a Fast-LIN bus adapter, a Local Interconnect Network (LIN) bus adapter, an Ethernet bus adapter, a FlexRay bus adapter or may be one to multiple or multiple to multiple, which is not limited for the specific implementation in the embodiments.

Figure 6:
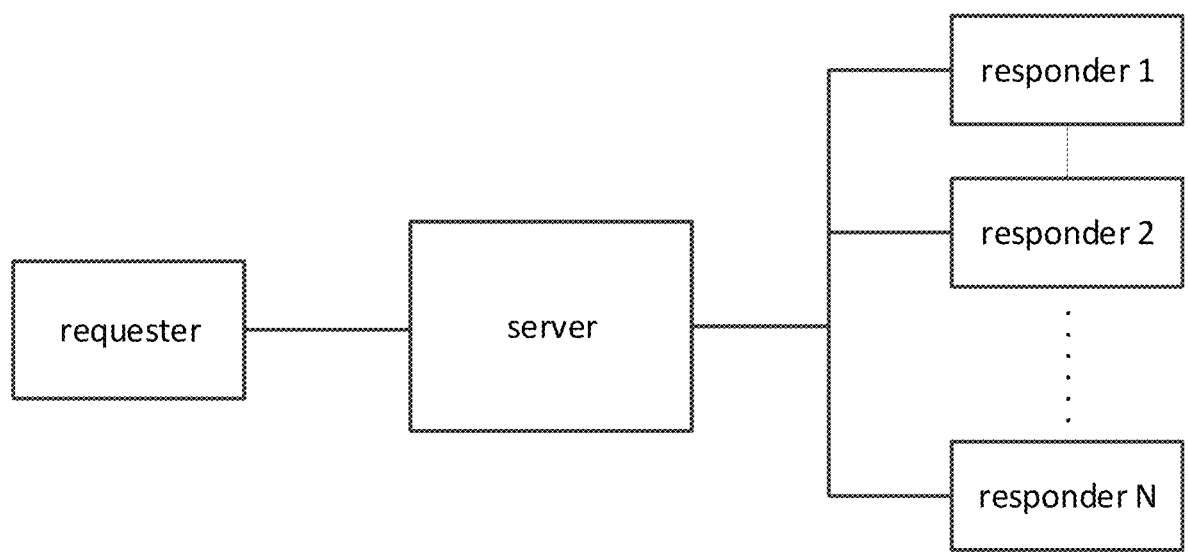
FIG. 6 is a principle block diagram illustrating a vehicular multi-location synergic remote calibration system according to some embodiments of the present disclosure.

As shown in FIG. 6, one or more embodiments further provide a vehicular multi-location synergic remote calibration system, which includes:
  a server, configured to store a calibration database and receive and store a calibration signal from a responder;
  a requester, configured to execute programs of performing the working method of the requester in the vehicular multi-location synergic remote calibration process as mentioned above;
  a responder, configured to send the calibration signal to the server, and further configured to receive a written target value from the server and complete vehicular online calibration.

The specific structures and the working methods of the requester, the responder and the server can be referred to the above vehicular multi-location synergic remote calibration method and the above working method of the requester in the vehicular multi-location synergic remote calibration process and will not be repeated herein.

One or more embodiments of the present disclosure provide a computer program product, including a computer program or instruction, where the computer program or instruction is executed on a computer to cause the computer to perform any one of the vehicular multi-location synergic remote calibration method or the working method of a requester in a vehicular multi-location synergic remote calibration system.

In some embodiments, a computer readable storage medium, storing computer readable instructions, wherein the computer readable instructions are executed by at least one processor to perform the method:
  invoking, by the requester, a calibration signal from a server to read a calibration signal value; and/or,
  sending, by the requester, to the server a calibration signal write command and sending to the server a command for reading a written calibration signal.

In some embodiments, A computer program product, comprising a computer readable storage medium on which computer readable program codes are stored, wherein the computer readable program codes comprise instructions, which cause at least one processor (one or more computer devices) to perform the following operations:
  invoking, by the requester, a calibration signal from a server to read a calibration signal value; and/or,
  sending, by the requester, to the server a calibration signal write command and sending to the server a command for reading a written calibration signal.

In the several embodiments provided by the present disclosure, it should be understood that the disclosed device and method can be implemented another way. The above device embodiments are merely illustrative, for example, the flowcharts or block diagrams in the drawings show possible system architectures, functions and operations of the device, method, and computer program product in the several embodiments provided by the present disclosure. Thus, each block in the flowcharts or block diagrams may represent one module, one program fragment or one part of codes. The module, the program fragment or the part of codes includes one or more executable instructions for implementing the specified logic functions. It should be noted that in some alternative embodiments, the functions indicated in the blocks may also be performed in a sequence different from that indicated in the drawings. For example, two continuous blocks can be actually performed basically in parallel, and sometimes may be performed in a reverse sequence, which is dependent on the functions involved. It is further noted that each block in the block diagrams and/or flowcharts and the combinations of the blocks in the block diagrams and/or flowcharts may be implemented by a dedicated hardware-based system for executing specified functions or actions, or by combination of dedicated hardware and computer instructions.

Furthermore, the functional modules in the embodiments of the present disclosure can be integrated into one independent part, or exist as separate modules or two or more of the modules are integrated into one independent part.

The functions, when implemented by software function modules and sold or used as separate products, can be stored in one computer readable storage medium. Based on such understanding, the essence of technical solutions of the present disclosure, or a part contributing to the prior arts or a part of the technical solutions can be embodied in the form of software product. The computer software product is stored in one storage medium which includes several instructions to enable one computer device (for example, a personal computer, a server, or a network device or the like) to perform all or part of the steps of the method of each of the embodiments of the present disclosure.

Enlightened by the ideal embodiments of the present disclosure, relevant workers can, based on the contents of the specification, make various changes and modifications within the scope of protection of the technical idea of the present disclosure. The technical scope of the present disclosure is not limited to the contents of the specification but to the technical scope claimed by the claims.

What is claimed is:

1. A vehicular multi-location synergic remote calibration system, comprising:
  a server comprising a processor, configured to store a calibration database and receive and store a calibration signal from a responder;
  a requester comprising a requester processor, configured to invoke the calibration signal from the server to read a calibration signal value; and/or, send a calibration signal write command to the server and send to the server a command for reading the written calibration signal; and
  a responder comprising a computer device and a bus adapter, configured to send the calibration signal to the server, and further configured to receive a written target value from the server and complete corresponding vehicular online calibration, wherein,
  the requester creates a corresponding mapping system variable for each calibration signal of the server;
  an initial value is assigned to the corresponding mapping system variable; and
  invoking, by the requester, the calibration signal from the server to read the calibration signal value comprises:
  for a calibration signal defined as an observation variable, obtaining, by a calibration module in the requester, the calibration signal value stored in the server and storing the calibration signal value into a corresponding mapping system variable; and
  when reading the corresponding mapping system variable, reading a last-stored value of the corresponding mapping system variable.

2. The vehicular multi-location synergic remote calibration system of claim 1, wherein, the requester creates a corresponding mapping system variable for each calibration signal of the server;

an initial value is assigned to the corresponding mapping system variable; and sending, by the requester, the calibration signal write command to the server, and sending to the server the command for reading the written calibration signal comprises:

for a calibration signal defined as a calibration variable, associating, by the requester, an assignment function to an asynchronous function, wherein the assignment function is a mapping system variable write function of a to-be-written target value; and when the calibration variable is written, sending, by the asynchronous function, a write command and a read command to the server, and then returning, wherein a call of the asynchronous function is completed.

3. The vehicular multi-location synergic remote calibration system of claim 1, wherein, the requester creates a corresponding mapping system variable for each calibration signal of the server;

an initial value is assigned to the corresponding mapping system variable; and sending, by the requester, the calibration signal write command to the server, and sending to the server the command for reading the written calibration signal comprises:

for a calibration signal defined as a writable observation variable, associating, by the requester, an assignment function to an asynchronous function, wherein the assignment function is a mapping system variable write function of a to-be-written target value; and when the writable observation variable is written, sending, by the asynchronous function, a write command and a read command to the server, and then returning, wherein a call of the asynchronous function is completed.

4. The vehicular multi-location synergic remote calibration system of claim 1, wherein, when the server executes a write command and a read command successfully at the same time, the requester refreshes the last-stored value of the corresponding mapping system variable into a to-be-written target value and sends the written target value to the server.

5. The vehicular multi-location synergic remote calibration system of claim 4, wherein, in response to that the requester fails to receive a calibration signal of the server, if the requester still writes the corresponding mapping system variable for the calibration signal of the server, the requester reports an error.

6. The vehicular multi-location synergic remote calibration system of claim 5, wherein, the requester is further applicable to batch-modifying values of mapping system variables through wildcard.

7. The vehicular multi-location synergic remote calibration system of claim 5, wherein, code update is performed through wildcard in a graphic program of the requester, and a running result of the graphic program of the requester is sent to at least one responder through the server.

8. The vehicular multi-location synergic remote calibration system of claim 1, wherein, the computer device is configured to send a calibration signal to a server, and receive a written target value from the server; and the bus adapter is configured to read a calibration signal from an electronic control unit (ECU), and further configured to distribute the written target value to the ECU to complete corresponding vehicular online calibration.

9. The vehicular multi-location synergic remote calibration system of claim 8, wherein, the bus adapter is a Controller Area Network (CAN) bus adapter, or a Controller Area Network Flexible Data Rate (CANFD) bus adapter, or a FastLIN bus adapter, or a Local Interconnect Network (LIN) bus adapter, or an Ethernet bus adapter, or a FlexRay bus adapter.

10. A vehicular multi-location synergic remote calibration method, comprising:

invoking, by a requester, a calibration signal from a server to read a calibration signal value; and/or, send a calibration signal write command to the server and send to the server a command for reading the written calibration signal; and sending, by a responder, the calibration signal to the server, and further receiving a written target value from the server and completing corresponding vehicular online calibration, wherein, the requester creates a corresponding mapping system variable for each calibration signal of the server;

an initial value is assigned to the corresponding mapping system variable; and invoking, by the requester, the calibration signal from the server to read the calibration signal value comprises:

for a calibration signal defined as an observation variable, obtaining, by a calibration module in the requester, the calibration signal value stored in the server and storing the calibration signal value into a corresponding mapping system variable; and when reading the corresponding mapping system variable, reading a last-stored value of the corresponding mapping system variable.

11. The vehicular multi-location synergic remote calibration method of claim 10, wherein, the requester creates a corresponding mapping system variable for each calibration signal of the server;

an initial value is assigned to the corresponding mapping system variable; and sending, by the requester, the calibration signal write command to the server, and sending to the server the command for reading the written calibration signal comprises:

for a calibration signal defined as a calibration variable, associating, by the requester, an assignment function to an asynchronous function, wherein the assignment function is a mapping system variable write function of a to-be-written target value; and when the calibration variable is written, sending, by the asynchronous function, a write command and a read command to the server, and then returning, wherein a call of the asynchronous function is completed.

12. The vehicular multi-location synergic remote calibration method of claim 10, wherein, when the server executes a write command and a read command successfully at the same time, the requester refreshes the last-stored value of the corresponding mapping system variable into a to-be-written target value and sends the written target value to the server.

13. The vehicular multi-location synergic remote calibration method of claim 12, wherein, in response to that the requester fails to receive a calibration signal of the server, if the requester still writes the corresponding mapping system variable for the calibration signal of the server, the requester reports an error.

14. The vehicular multi-location synergic remote calibration method of claim 13, wherein, the requester is further applicable to batch-modifying values of mapping system variables through wildcard.

15. The vehicular multi-location synergic remote calibration method of claim 13, wherein, code update is performed through wildcard in a graphic program of the requester, and a running result of the graphic program of the requester is sent to at least one responder through the server.

* * * * *